United States Patent
Kaneko

[11] Patent Number: 5,894,633
[45] Date of Patent: Apr. 20, 1999

[54] TILT HINGE

[75] Inventor: Takayuki Kaneko, Kanagawa, Japan

[73] Assignee: Katoh Electrical Machinery Co., Ltd., Kanagawa, Japan

[21] Appl. No.: 08/784,838

[22] Filed: Jan. 17, 1997

[30] Foreign Application Priority Data

Jan. 18, 1996 [JP] Japan ................................ 8-006916

[51] Int. Cl.$^6$ .............................. E05D 11/08; E05F 1/12
[52] U.S. Cl. .................. 16/306; 16/307; 16/337; 403/120
[58] Field of Search .......................... 16/306, 307, 337, 16/342; 403/120, 146

[56] References Cited

U.S. PATENT DOCUMENTS

| 5,022,778 | 6/1991 | Lu | 403/120 |
|---|---|---|---|
| 5,208,944 | 5/1993 | Lu | 16/340 |
| 5,239,731 | 8/1993 | Lu | 16/342 |
| 5,340,073 | 8/1994 | Masakazu | 403/120 |

FOREIGN PATENT DOCUMENTS

| 5-141144 | 6/1993 | Japan | 16/337 |
|---|---|---|---|
| 6-17570 | 1/1994 | Japan | 16/337 |

Primary Examiner—Chuck Y. Mah
Assistant Examiner—Donald M. Gurley
Attorney, Agent, or Firm—Notaro & Michalos P.C.

[57] ABSTRACT

A tilt hinge supports a cover so that the cover can lightly be opened and can be held in an inclined position at an optional angular position. The tilt hinge comprises: a mounting member having a mounting plate and a bearing plate, and attached to a main unit of a machine; a stepped shaft having an expanded section and a reduced section of a diameter smaller than that of the expanded section, supported for rotation on the bearing plate; a support member for supporting a cover, fixed to the shaft; a torsion coil spring wound around the shaft and resiliently engaged between the support member and the mounting member; and a friction mechanism interlocked with the bearing plate and the shaft. The friction mechanism comprises: a first friction plate mounted on a portion of the reduced section of the shaft, extending between one side surface of the bearing plate and the expanded section of the shaft; a spring washer mounted on the portion of the reduced section of the shaft in combination with the first friction plate; a second friction plate mounted on a portion of the reduced section of the shaft, extending between the other side surface of the bearing plate and the upset end of the reduced section of the shaft; and a flat washer mounted on the portion of the reduced section of the shaft in combination with the second friction plate.

8 Claims, 3 Drawing Sheets

TILT HINGE

BACKGROUND OF THE INVENTION

1. Field of the Invention

The present invention relates to a tilt hinge suitable for supporting a cover included in a business machine, such as a scanner.

2. Description of the Related Art

A known tilt hinge for supporting a display unit included in a laptop type business machine for office automation comprises a mounting member having a bearing plate and attached to a main unit of the business machine, a shaft supported for rotation on the bearing plate, a support member for supporting the display unit, attached to the shaft, and a friction mechanism interlocked with the shaft and the bearing plate to enable the shaft to be rotated only when a torque equal to or greater than a predetermined torque is applied thereto.

Since this known tilt hinge needs to hold the relatively heavy display unit attached to the support member at a predetermined inclination, the friction mechanism must be capable of exerting a relatively high friction torque on the support member. If such a tilt hinge is employed in supporting, for example, a relatively light cover of a scanner, the cover experiences a high frictional resistance and is felt to be heavy when the same is turned on the tilt hinge, and cannot be turned smoothly, which is a problem in the operability of the scanner.

SUMMARY OF THE INVENTION

Accordingly, it is an object of the present invention to provide a tilt hinge of a simple construction, capable of supporting a cover so that the cover can lightly be opened and can securely be held at a desired inclination.

According to one aspect of the present invention, a tilt hinge comprises: a mounting member having a mounting plate and a bearing plate, and attached to a main unit of a machine; a stepped shaft having an expanded section and a reduced section of a diameter smaller than that of the expanded section, supported for rotation on the bearing plate; a support member for supporting a cover, fixed to the shaft; a torsion coil spring wound around the shaft and resiliently engaged between the support member and the mounting member; and a friction mechanism interlocked with the bearing plate and the shaft.

When the cover is turned in an opening direction on the tilt hinge for opening, the shaft turns together with the support member, and the cover can lightly be turned for opening even if the friction mechanism provides a frictional resistance against the turning of the cover in the opening direction, because of the agency of the resilience of the torsion coil spring rotationally biasing the support member in the opening direction. When the cover is turned to an angular position where the cover is inclined at an inclination in the range of 30 to 60° C. at which the cover is often held, the angular moment of the cover is counterbalanced by a torque applied by the torsion spring to the cover and a frictional resistance provided by the friction mechanism against the turning of the cover. Consequently, the cover can securely be held at the angular position and will not turn naturally in either an opening direction or a closing direction.

The friction mechanism may comprise a friction plate mounted on a portion of the reduced section of the shaft, extending between one side surface of the bearing plate and the expanded section of the shaft, a spring washer mounted on the portion of the reduced section of the shaft in combination with the friction plate, a friction plate mounted on a portion of the reduced section of the shaft, extending between the other side surface of the bearing plate and the upset end of the reduced section of the shaft, and a flat washer mounted on the portion of the reduced section of the shaft in combination with the friction plate.

When the spring washer mounted on the reduced section of the shaft extending on one side of the bearing plate, and the friction plate and flat washer mounted on the reduced section of the shaft extending on the other side of the bearing plate turn together with the shaft, the friction plate applies a frictional resistance to the turning spring washer, and the bearing plate applies a frictional resistance to the other turning friction plate. Since the expanded section of the shaft applies a uniform pressure to the spring washer, a stable friction torque is available.

According to another aspect of the present invention, a tilt hinge comprises: a mounting member having a mounting plate and a bearing plate, and attached to a main unit of a machine; a stepped shaft having an expanded section and a reduced section of a diameter smaller than that of the expanded section, supported for rotation on the bearing plate; a support member for supporting a cover, fixed to the reduced section of the shaft; a torsion coil spring wound around the shaft and resiliently engaged between the support member and the shaft; a friction plate mounted on a portion of the reduced section of the shaft extending between the bearing plate and the expanded section of the shaft, and restrained from turning by the bearing plate; a spring washer mounted on the portion of the reduced section of the shaft in combination with the friction plate; a friction plate mounted on a portion of the reduced section of the shaft extending between the bearing plate and the support member in contact with the bearing plate so as to turn together with the shaft; and a flat washer mounted on the portion of the reduced section of the shaft in combination with the friction plate so as to turn together with the shaft. The shaft can be turned by a torque equal to or greater than a predetermined torque.

The torsion coil spring biases the shaft in the opening direction in which the cover is turned for opening. Since the support member supporting the cover is attached to the shaft, the same operations as those mentioned above are executed. Since the torsion coil spring and the support member are disposed on the shaft on the opposite sides of the bearing plate, respectively, the tilt hinge has a well balanced configuration.

According to a third aspect of the present invention, a tilt hinge comprises: a mounting member having a mounting plate and a bearing plate, and attached to a main unit of a machine; a stepped shaft having an expanded section and a reduced section of a diameter smaller than that of the expanded section, supported for rotation on the bearing plate, and having an interlocking portion of a special cross section; a support member for supporting a cover, provided with an interlocking opening of a special shape corresponding to the special cross section of the interlocking portion of the reduced section, and mounted on the reduced section of the shaft with the interlocking portion of the reduced section of the shaft fitted in the opening thereof; a torsion coil spring wound around the shaft and resiliently engaged between the support member and the shaft; a friction plate mounted on a portion of the reduced section of the shaft extending between the bearing plate and the expanded section of the shaft, in contact with the bearing plate; a spring washer mounted on the portion of the reduced section of the shaft in combination with the friction plate in contact with the friction plate and an end surface of the expanded section of the shaft; a friction plate disposed between the support member and the bearing plate in contact with the bearing plate; and a flat washer disposed in contact with the friction plate and the support member. The free end of the reduced section of the shaft is upset. Then, the shaft is able to turn against a predetermined frictional resistance.

Since the end of the reduced section of the shaft is upset, the friction between the friction plate and the bearing plate, and the friction between the friction plate and the spring washer are stabilized, the torque is stabilized and hence different tilt hinges provide the same torque.

A surface of the bearing plate to be in contact with the support member-side friction plate may be provided with waffle knurls, the friction plate in contact with the bearing plate on the side of the expanded section of the shaft may be restrained from turning relative to the bearing plate, the friction plate may be made of phosphor bronze, or the mounting member may be provided with a stopping lug to limit the turning of the support member beyond a limit angular position in an opening direction.

If the surface of the bearing plate is provided with the waffle knurls, the friction oil retaining ability of the surface is improved. Therefore, the variation in frictional resistance and generation of noise can effectively prevented for a long use of the tilt hinge.

If the friction plate is restrained from turning by the bearing plate, the spring washer must turn together with the shaft against a frictional resistance exerted thereon by the friction plate. Therefore, the friction plate fully exerts its effect if the same is made of a highly abrasion-resistant material and the variation in friction torque can be suppressed to the least extent for a long use of the tilt hinge.

If the friction plate is made of phosphor bronze, the reduction and variation in friction torque produced by the friction plate after the long use of the tilt hinge can be suppressed to the least extent because the phosphor bronze has an excellent abrasion-resistant property.

If the angular range of turning of the support member is limited by the stopping lug of the mounting member, the angle of opening of the cover attached to the support member can accurately be controlled. Therefore, the torsion coil spring may not accidentally experience an excessive torque, and the cover may not naturally turn by its own angular moment beyond a limit angular position.

DESCRIPTION OF THE PREFERRED EMBODIMENTS

Figure 1:
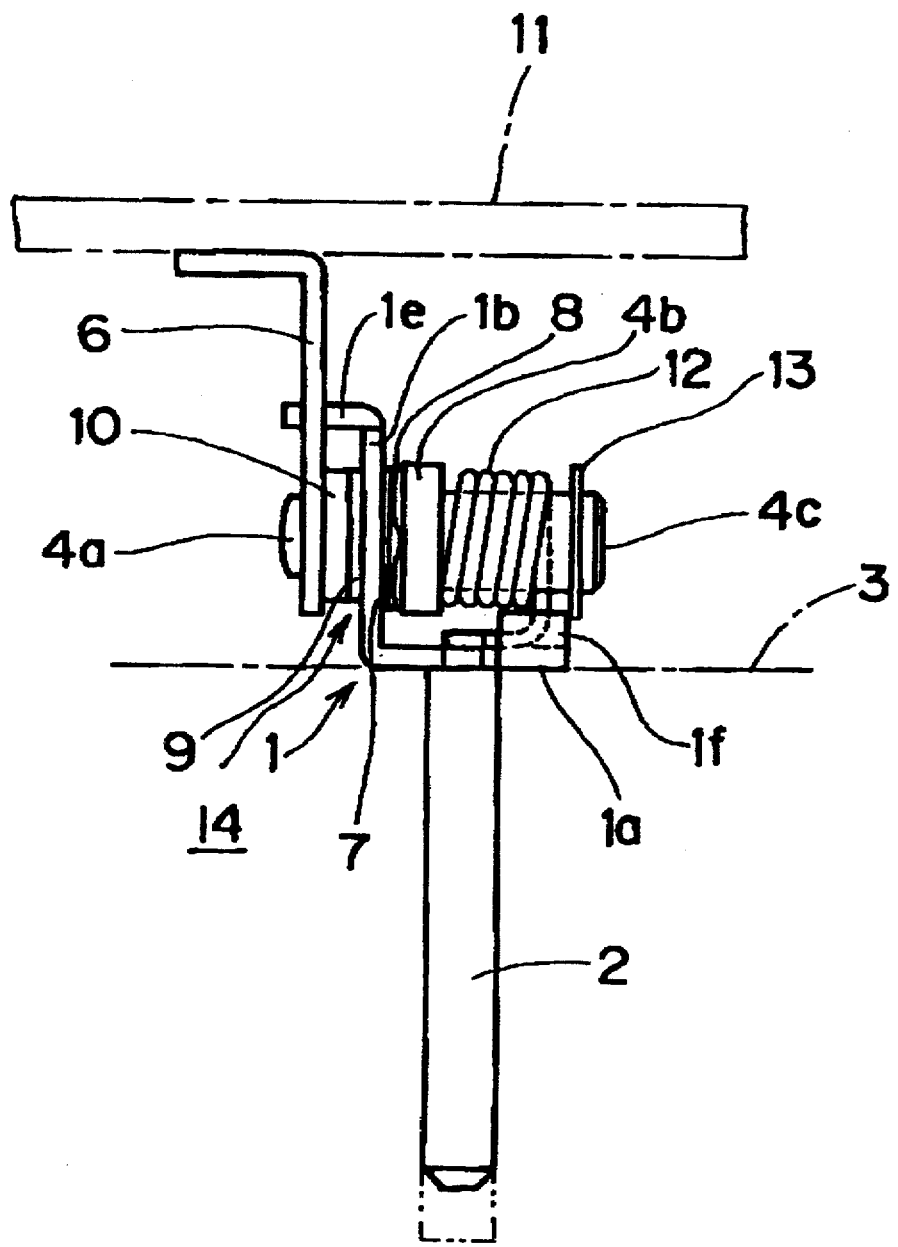
FIG. 1 is a front view of a tilt hinge in a preferred embodiment according to the present invention.
Figure 2:
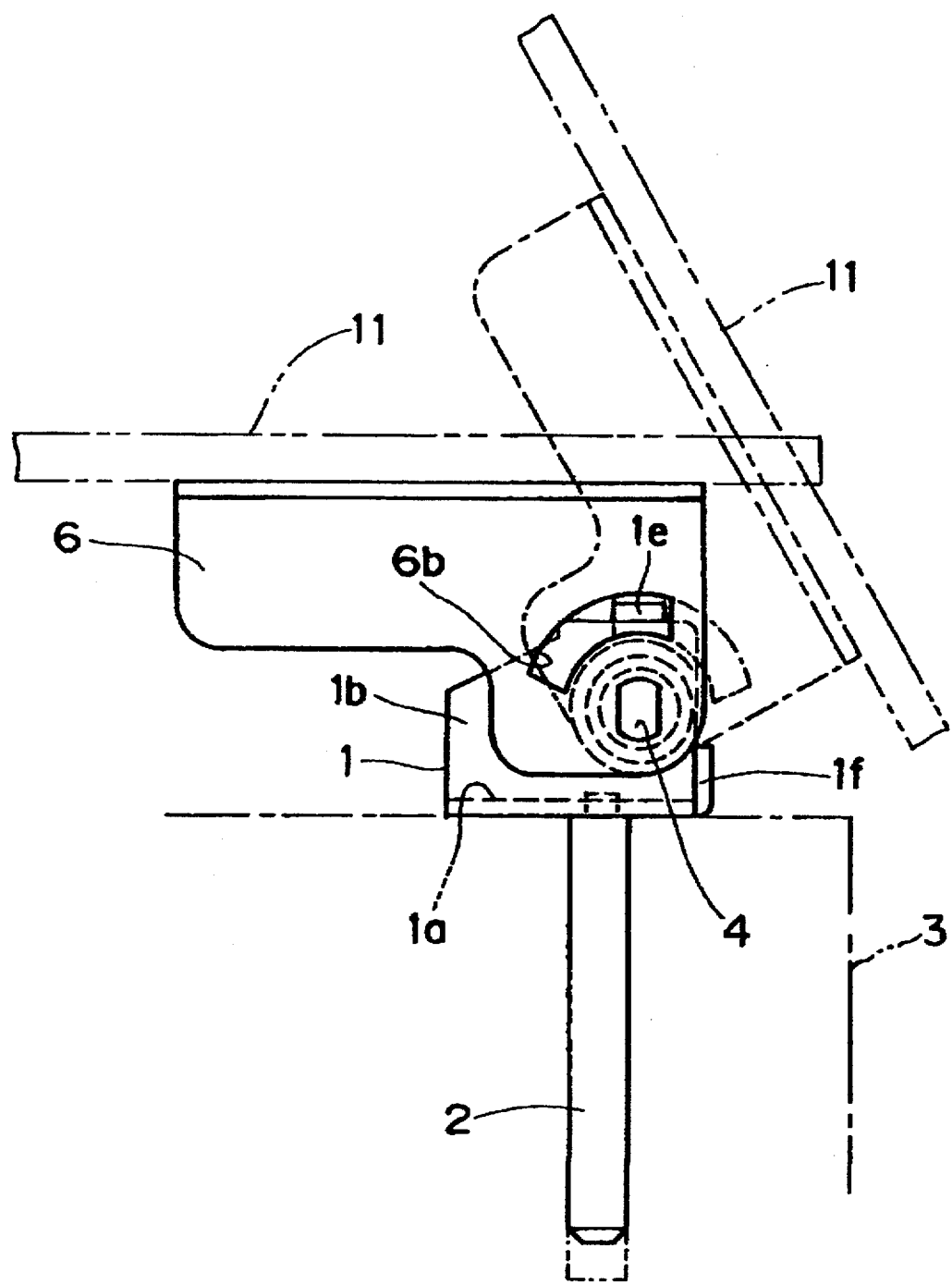
FIG. 2 is a side view of the tilt hinge of FIG. 1.
Figure 3:
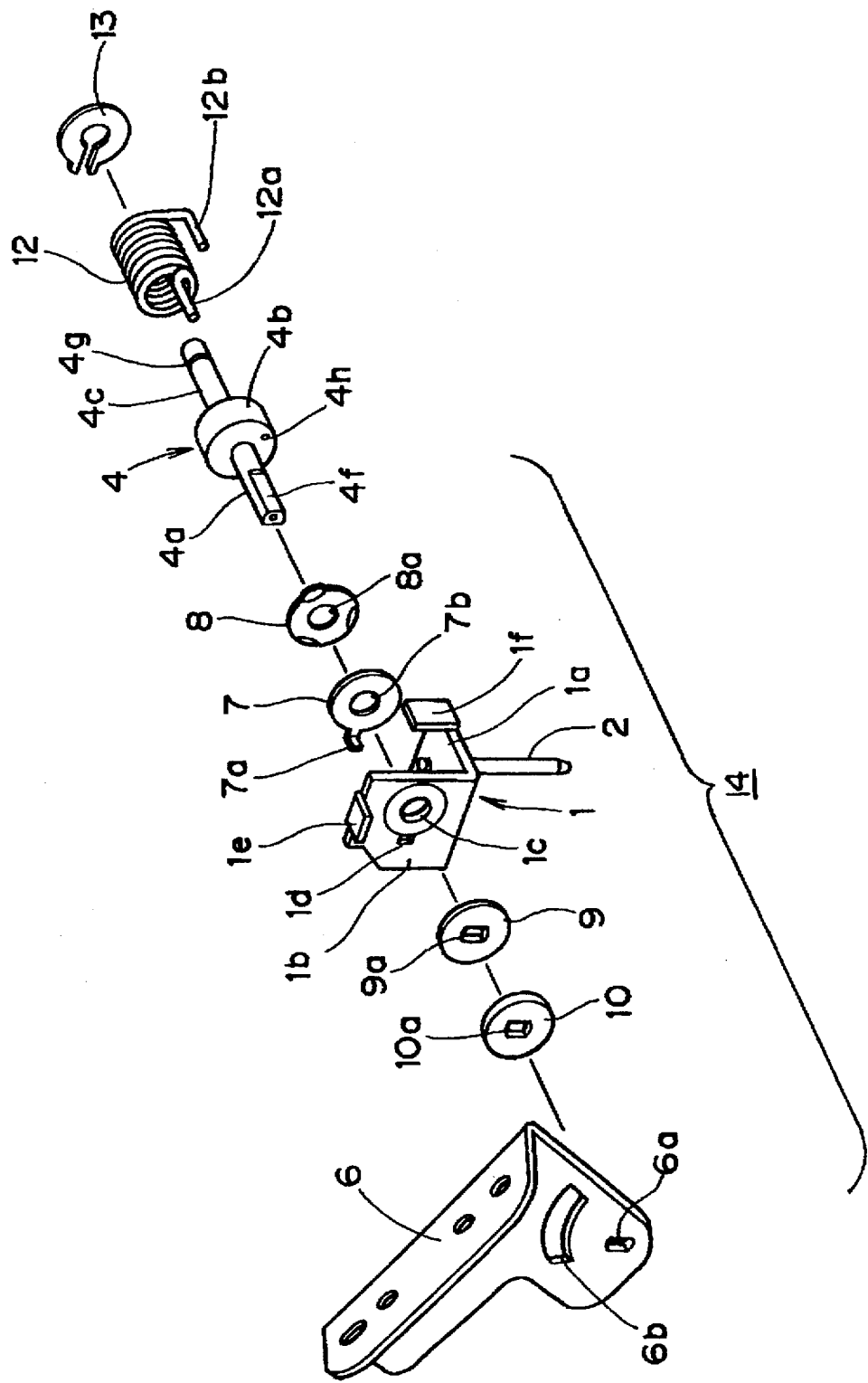
FIG. 3 is an exploded perspective view of the tilt hinge of FIG. 1.

Referring to FIGS. 1 to 3, a mounting member 1 has a mounting plate 1a and a bearing plate 1b integrally formed by bending a steel plate substantially in an L-shape, and a mounting leg 2 projected vertically down from the mounting plate 1a is detachably inserted in a mounting hole, not shown, formed in a main unit 3 of a machine, indicated by an alternate long and two short dashes line. A stepped shaft 4 has a reduced section 4a, an expanded section 4b and a spring support section 4c. The reduced section 4a of the shaft 4 is fitted rotatably in a bearing hole 1c formed in the bearing plate 1b to support the shaft 4 for rotation on the mounting member 1. The spring support section 4c is provided with an annular groove 4g in its circumference, and the expanded section 4b of the shaft 4 is provided with a retaining hole 4h having an axis parallel to the axis thereof.

An annular knurled region 5 is formed around the bearing hole 1c in one side surface of the bearing plate 1b. The annular knurled region 5 is provided with waffle knurls. The bearing plate 1b is provided with a retaining hole 1d and a stopping lug 1e. The mounting plate 1a is provided with a retaining lug 1f.

An interlocking portion 4f of a special cross section is formed in the reduced section 4a, and an interlocking opening 6a of a cross section corresponding to that of the interlocking portion 4f is formed in a support member 6. The support member 6 is mounted on the reduced section 4a with the interlocking portion 4f fixedly fitted in its interlocking opening 6a and with the stopping lug 1e of the bearing plate 1b received in a circular slot 6b formed therein. A cover 11 indicated by alternate long and two short dashes lines is attached to the support member 6. A friction plate 7 made of, for example, phosphor bronze and provided with a central hole 7b and a stopping lug 7a is mounted on the reduced section 4a at a position between the expanded section 4b and the bearing plate 1b, with the stopping lug 7a received in the retaining hole 1d of the bearing plate 1b and the reduced section 4a of the shaft 4 extending through the central hole 7b thereof. A spring washer 8 having a central hole 8a is mounted on the reduced section 4a at a position between the friction plate 7 and the expanded section 4b.

A friction plate 9 and a flat washer 10 are interposed between the side surface of the bearing plate 1b provided with the annular knurled region 5, and the support member 6, with the end portion of the reduced section 4a extending through central interlocking holes 9a and 10a of a cross section corresponding to that of the interlocking portion 4f of the reduced section 4a. The extremity of the reduced section 4a is upset so that predetermined friction torques are exerted by the bearing plate 1b on the friction plate 9 and by the friction plate 7 on the spring washer 8, respectively. The mating surfaces of the friction plate 7 and the spring washer 8, and the mating surfaces of the annular knurled region 5 and the friction plate 9 are coated with a friction oil, such as Stemic P1.

The friction plate 7 and spring washer 8 interposed between the bearing plate 1b and the expanded section 4b, the friction plate 9 and flat washer 10 interposed between the bearing plate 1b and the support member 6, the friction oil, and the upset extremity of the reduced section 4a construct a friction mechanism 14.

If the diameter of the reduced section 4a is as small as, for example, 4 mm, the extremity of the reduced section 4a is upset in a flat upset because parallel flat surfaces are formed in the reduced section 4a to form the interlocking portion 4f. If the reduced section 4a has a diameter not less than, for example, 6 mm, a curled upset may be formed.

A torsion coil spring 12 is wound round the spring support section 4c of the shaft 4. One end 12a of the torsion spring 12 is inserted in the retaining hole 4h of the expanded section 4b and the other end 12b of the same is engaged with the retaining lug 1f of the mounting member 1. A C-ring 13 is fitted in the annular groove 4g of the spring support section 4c to hold the torsion spring 12 in place.

The diameter of the spring support section 4c is optional and may be equal to that of the reduced section 4a or the expanded section 4b. The support member 6 may be fixed to the spring support section 4c, and the extremity of the reduced section 4a projecting from the flat washer 10 may be upset. If the support member 6 is thus fixed to the spring support section 4c, the support member 6 is not regarded as a component of the friction mechanism 14. The flat washer 10 may be omitted and the friction plate 9 may be replaced with a friction plate of a thickness greater than that of the friction plate 9.

What is claimed is:

1. A tilt hinge, comprising:

an L-shaped mounting member including a mount plate portion for fixing the mounting member to an object and a bearing plate portion having a bearing hole formed therethrough;

a rotating shaft having a small-diameter portion, a large-diameter portion between the small-diameter portion and a medium-diameter portion, a segment of the small-diameter portion having a non-circular cross-section and being rotatably supported in the bearing hole;

a lid supporting member for fixing to a lid of the object, the supporting member having a non-circular hole formed therein through which the non-circular cross-section segment of the rotating shaft is inserted in fixed relation so that the lid supporting member is rotatable with the rotating shaft;

a torsion spring encircling the medium-diameter portion of the rotating shaft, one end of the torsion spring resting on the mounting member, the other end of the torsion spring resting on the large-diameter portion of the rotating shaft, the shaft being forced to rotate in one direction by the torsion spring; and a friction mechanism provided between the mounting member and the rotating shaft for controlling the rotation of the rotating shaft, the friction mechanism comprising a first friction plate and spring washer in contact with each other interposed between the bearing plate of the mounting member and the large-diameter portion of the rotating shaft, each of the first friction plate and spring washer having a through-hole formed through their centers, the small-diameter portion being inserted through the through-holes, and a second friction plate and second washer in contact with each other and interposed between the bearing plate and the lid supporting member, each of the second friction plate and second washer having non-circular holes through their centers, the non-circular cross section segment being inserted through the non-circular holes, the free end of the small-diameter portion being riveted at a side of the lid supporting member so that when a predetermined rotating torque is applied, the rotating shaft is rotatable with the lid supporting member.

2. A tilt hinge according to claim 1, wherein a surface of the bearing plate facing the support member and contacting the second friction plate has a knurled region with waffle knurls.

3. A tilt hinge according to claim 1, wherein at least one of the first friction plate and second friction plate are made of phosphor bronze.

4. A tilt hinge according to claim 1, wherein the mounting member is provided with a stop piece for abutting the lid supporting member to limit the lid supporting member and lid from rotating beyond a predetermined angle.

5. A tilt hinge, comprising:

an L-shaped mounting member including a mount plate portion for fixing the mounting member to an object and a bearing plate portion having a bearing hole formed therethrough;

a rotating shaft having a small-diameter portion, a large-diameter portion between the small-diameter portion and a medium-diameter portion, a segment of the small-diameter portion having a non-circular cross-section and being rotatably supported in the bearing hole;

a lid supporting member for fixing to a lid of the object, the supporting member having a non-circular hole formed therein through which the non-circular cross-section segment of the rotating shaft is inserted in fixed relation so that the lid supporting member is rotatable with the rotating shaft;

a torsion spring encircling the medium-diameter portion of the rotating shaft, one end of the torsion spring resting on the mounting member, the other end of the torsion spring resting on the large-diameter portion of the rotating shaft, the shaft being forced to rotate in one direction by the torsion spring; and a friction mechanism provided between the mounting member and the rotating shaft for controlling the rotation of the rotating shaft, the friction mechanism comprising:

a first friction plate fixed to one side of the bearing plate and having a first plate hole in the center through which the small-diameter portion is inserted;

a spring washer in contact with the first friction plate, the spring washer located between the first friction plate and the large-diameter portion of the rotating shaft, the spring washer having a through-hole formed through its center, the small-diameter portion being inserted through the spring washer through-hole;

a second friction plate in contact with the other side of the bearing plate and having a non-circular plate hole through its center, the non-circular cross section segment being inserted through the non-circular plate hole;

a flat washer in contact with the second friction plate, located between the second friction plate and the lid supporting member, the flat washer having a non-circular washer hole through its center, the non-circular cross section segment extending through the non-circular washer hole; and a riveted portion formed by a free end of the non-circular cross section segment riveted to the lid supporting member to press the first friction plate against the spring washer and press the second friction plate against the bearing plate portion.

the free end of the small-diameter portion being riveted at a side of the lid supporting member so that when a predetermined rotating torque is applied, the rotating shaft is rotatable with the lid supporting member.

6. A tilt hinge according to claim 5, wherein a surface of the bearing plate facing the support member and contacting the second friction plate has a knurled region with waffle knurls.

7. A tilt hinge according to claim 5, wherein at least one of the first friction plate and second friction plate are made of phosphor bronze.

8. A tilt hinge according to claim 5, wherein the mounting member is provided with a stop piece for abutting the lid supporting member to limit the lid supporting member and lid from rotating beyond a predetermined angle.

* * * * *